United States Patent
Capps, Jr. et al.

[11] Patent Number: 6,069,850
[45] Date of Patent: May 30, 2000

[54] METHOD AND APPARATUS FOR DRIVING A BATTERY-BACKED UP CLOCK WHILE A SYSTEM IS POWERED-DOWN

[75] Inventors: Louis Bennie Capps, Jr., Round Rock; Robert Christopher Dixon; Khuong Huu Pham, both of Austin, all of Tex.

[73] Assignee: International Business Machines Corporation, Armonk, N.Y.

[21] Appl. No.: 09/040,430

[22] Filed: Mar. 18, 1998

[51] Int. Cl.[7] .............................. G04G 5/00; G06F 1/04
[52] U.S. Cl. ........................................... 368/156; 713/500
[58] Field of Search ....................... 368/10, 62, 155–156, 368/203–204; 331/44, 49; 395/550; 713/50–503

[56] References Cited

U.S. PATENT DOCUMENTS

| | | |
|---|---|---|
| 3,899,746 | 8/1975 | Gammel . |
| 4,575,848 | 3/1986 | Moore et al. . |
| 4,582,434 | 4/1986 | Plangger et al. . |
| 4,667,328 | 5/1987 | Imran ......................................... 371/61 |
| 5,142,247 | 8/1992 | Lada, Jr. et al. . |
| 5,381,542 | 1/1995 | Carlson .................. 395/550 |
| 5,530,389 | 6/1996 | Rieder et al. . |
| 5,568,064 | 10/1996 | Beers et al. . |
| 5,623,234 | 4/1997 | Shaik et al. ............................... 331/49 |

FOREIGN PATENT DOCUMENTS

| | | |
|---|---|---|
| 56-168833 | 1/1981 | Japan . |
| 58-113889 | 7/1983 | Japan . |
| 61-195388 | 8/1986 | Japan . |
| 62-189520 | 8/1987 | Japan . |
| 3-131795 | 6/1991 | Japan . |

*Primary Examiner*—Vit Miska
*Attorney, Agent, or Firm*—Leslie A. Van Leeuwen

[57] ABSTRACT

A method and apparatus for driving a battery-backed up clock while a computer system is powered-down. The present invention uses an auxiliary power supply, VAUX, to power a microprocessor bus oscillator. The microprocessor bus oscillator is typically a high frequency, highly accurate oscillator. The microprocessor bus oscillator continues to run while the computer system is powered down, but is connected to a wall outlet. Thus, it can be used to synthesize an accurate time base to drive a battery-backed up clock input. A microcontroller, PAL, or other such circuit can be used to convert the high frequency signal from the microprocessor bus oscillator to a frequency suitable for the battery-backed up clock. Thus, a single oscillator is used to keep time for normal operations. Only when the system is moved, or when main power fails, is a battery backed-up crystal oscillator used to keep time. This minimizes the occurrence of timing errors, due to the system being turned off and back on.

8 Claims, 2 Drawing Sheets

METHOD AND APPARATUS FOR DRIVING A BATTERY-BACKED UP CLOCK WHILE A SYSTEM IS POWERED-DOWN

FIELD OF THE INVENTION

The present invention relates to calculating time in a computer system, and, more particularly, to a method and apparatus for driving a battery-backed up clock while the system is powered-down.

BACKGROUND OF THE INVENTION

In many computer systems, real time is computed internally by a microprocessor. A highly accurate microprocessor bus oscillator acts as a clock source. For example, a 14.3 MHZ oscillator may act as a clock source, generating 14,300,000 ticks (i.e. cycles) per second. Clock ticks are accumulated in a high speed counter (i.e. decrementer), or system Real Time Clock (RTC). Real time is calculated as a function of the decrementer value and the known oscillator frequency. For example, if the decrementer has a value of 3 million ticks at time one, and a value of 2 million ticks at time two, then it can be determined that 0.0699 seconds have elapsed between time one and time two ((3 million−2 million)/14.3 million). The frequency of the microprocessor bus oscillator is specified over a given temperature and voltage range. This means that the frequency of the microprocessor bus oscillator will remain within a specified range over the given temperature and voltage range.

When a computer system is powered down, the system RTC value must be saved in a battery-backed up RTC. The battery-backed up RTC is a low power circuit, typically operating from a time base of 32,768 Hz (32 KHz). While the computer system is powered down, time is computed and saved in the battery-backup up RTC. However, the battery-backed up RTC is not nearly as accurate as the system RTC. This is because the frequency of the 32 KHz oscillator driving the battery-backed up RTC varies greatly as a function of temperature. A typical error margin is −0.04× (delta T)×(delta T), where (delta T) is the deviation from a nominal temperature of 25 degrees Celsius. Thus, the 32 KHz oscillator has a temperature coefficient with an inverse parabolic function, and the more the temperature varies from 25 degrees Celsius, the slower the battery-backed up RTC runs.

When power is restored to the computer, the battery-backed up RTC is copied into the system RTC, and the microprocessor's decrementer again keeps track of real time. However, any errors accumulated while the computer was powered off are inherited by the system RTC when the computer is powered on. A prior art method for dealing with this problem is the use of temperature-compensated 32 KHz oscillators to drive the battery backed up clock when the system is powered down. However, temperature-compensated oscillators are expensive, and are not typically suitable for battery operation.

Consequently, it would be desirable to have a low-cost method and apparatus for driving a battery-backed up RTC while a computer system is powered down. It would also be desirable to ensure accurate time-keeping by the battery-backed up clock while the system is powered down, and to minimize timing errors inherited by the system RTC when the system is powered on.

SUMMARY OF THE INVENTION

Accordingly, the present invention is directed to a method and apparatus for driving a battery-backed up clock while a computer system is powered-down. The present invention uses an auxiliary power supply, VAUX, to power a microprocessor bus oscillator. The microprocessor bus oscillator is typically a high frequency, highly accurate oscillator. The microprocessor bus oscillator continues to run while the computer system is powered down, but is connected to a wall outlet. Thus, it can be used to synthesize an accurate time base to drive a battery-backed up clock input. A microcontroller, PAL, or other such circuit can be used to convert the high frequency signal from the microprocessor bus oscillator to a frequency suitable for the battery-backed up clock.

One advantage of the present invention is that a single oscillator is used to keep time for normal operations. Only when the system is moved, or when main power fails, is a battery backed-up crystal oscillator used to keep time. Another advantage of the present invention is that timing errors, due to the system being turned off and back on, are minimized.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Many computer systems have an auxiliary power supply, typically referred to as VAUX, which continues to supply power to the system while it is turned off, but still connected to a main wall outlet. An auxiliary power supply is often used to power a power management unit or maintenance processor. The present invention uses VAUX to power a microprocessor bus oscillator, which thus continues to run while the computer system is connected to a wall outlet. The microprocessor bus oscillator is typically a high frequency, highly accurate oscillator. Thus, it can be used to synthesize an accurate time base to drive a battery-backed up clock input. One advantage of the present invention is that a single oscillator is used to keep time for normal operations. Only when the system is moved, or when main power fails, is a battery backed-up crystal oscillator used to keep time. Note that when the computer system is powered down, the real time value (i.e. date and time of day) is copied into the backup clock. When the computer system is powered up, as part of system initialization, the real time value is copied from the backup clock to the microprocessor real time clock.

Figure 1:
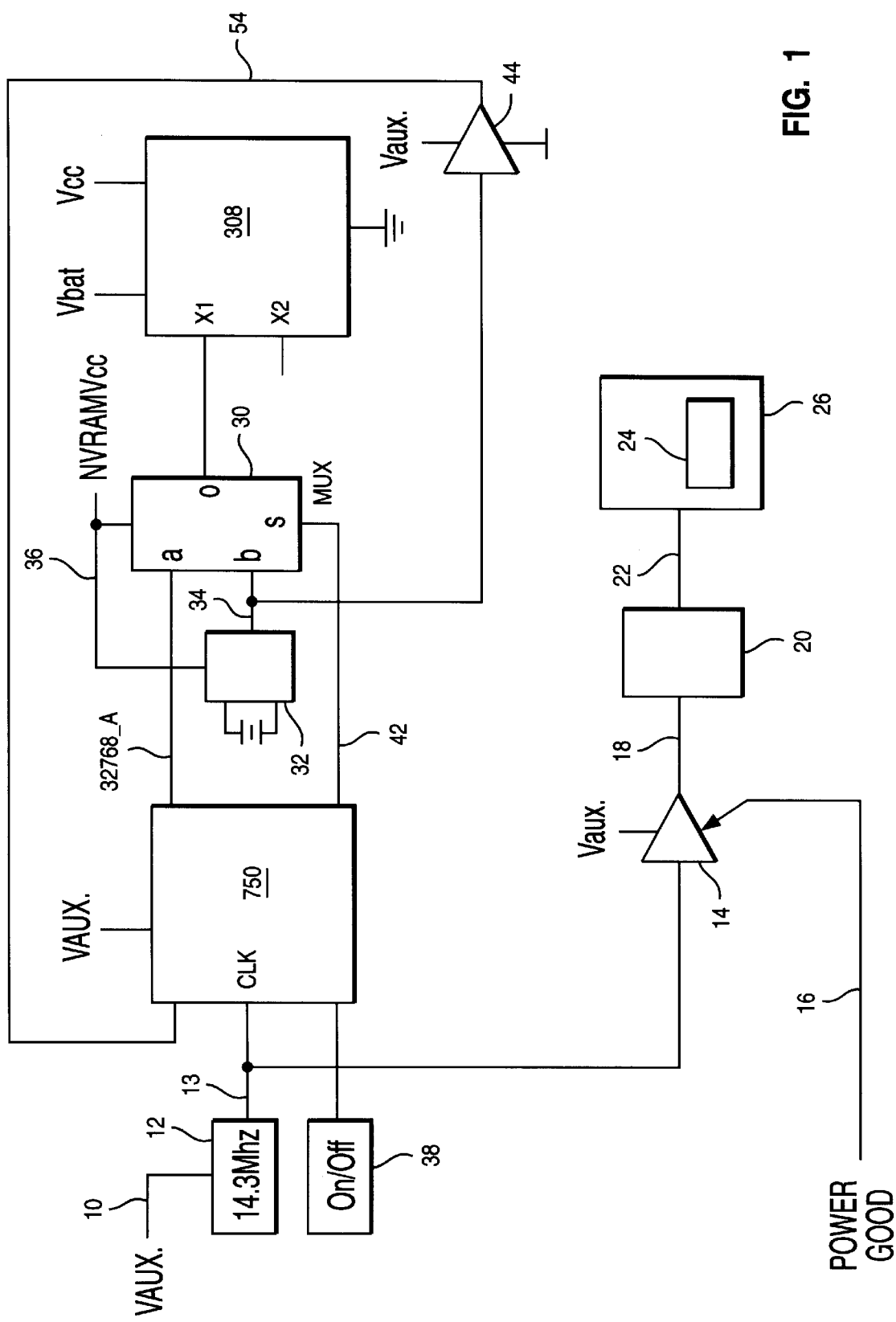
FIG. 1 is a circuit diagram of an embodiment of a master/slave time base circuit according to the teachings of the present invention.

Referring now to FIG. 1, an embodiment of the present invention will now be described. As shown in FIG. 1, VAUX 10 is used to power a high frequency, highly accurate microprocessor bus oscillator 12. In the described embodiment, oscillator 12 is a 14.3 MHz oscillator, whose frequency is specified as ±10 parts per million (ppm) over its operating temperature and voltage range. Oscillator 12 drives a microprocessor RTC. As shown in FIG. 1, signal 13 from oscillator 12 is input to buffer 14. "Power good" 16 is an indicator from a power supply (not shown) that the supply outputs are stable and in the specified range. Signal 18 from buffer 14 is input to phase locked loop microprocessor clock generator 20. Clock signal 22 is then input to decrementer 24 in microprocessor 26, which accumulates clock ticks to calculate real time, i.e. date and time of day, when the system is powered up.

Signal 13 from oscillator 12 is also input to circuit 750. In the described embodiment, circuit 750 is a microcontroller, which can be programmed using assembly language. Those skilled in the art will appreciate that any number of circuits may be used to implement the logic of circuit 750. Circuit 750 uses the 14.3 MHZ input from oscillator 12 to synthesize a 32 KHz time base, 32768$_{13}$ A. Note that the 32 KHz time base, 32768__A, need only be 32 KHz on average over time. For example, in the described embodiment, the instantaneous frequency of 32768__A is either greater or less than 32 KHz, but over a one second interval, the average frequency approaches 32 KHz. In the described embodiment, circuit 750 converts the 14.3 MHZ input from oscillator 12 to the 32 KHz output of 32768__A by executing a series of instruction, mostly "no operand" (i.e. nop) instructions, for a certain period of time. The instructions are executed at a frequency of 14.3 MHZ. At appropriate points in time (i.e. after a specified number of cycles have elapsed), 32768__A is pulsed (i.e. switched from high to low or low to high). Thus, a 32 KHz frequency is generated, and input to multiplexer 30. Note that multiple input frequencies may be accommodated by calling different timing loops, resulting in a constant 32 KHz output.

A 32 KHz oscillator 32 also supplies an input signal 34 to multiplexer 30. Note that oscillator 32 is powered by a battery (not shown), as indicated by input NVRAMVcc 36. Circuit 750 monitors on/off circuit 38 in order to determine whether VAUX 10 is available, and sends signal 42 to multiplexer 30. Signal 42 is output from circuit 750, and determines whether 32768__A or input signal 34 will be used to drive battery-backed up clock circuit 308. Circuit 308 is powered by a battery (Vbat and Vcc), and thus will continue to operate even when VAUX 10 is not available. Field effect transistor (FET) input comparator 44 allows circuit 750 to monitor 32 KHz oscillator 32 for the purpose of synchronously switching multiplexer 30 between 32768__A and signal 34 from oscillator 32. If the system becomes unplugged, or main power fails, on/off circuit 38 detects VAUX 10 falling below a threshold voltage, and circuit 750 determines that oscillator 32 should now provide a 32 KHz signal. This allows oscillator 32 to (control the frequency of operation.

When the system is plugged in again, or main power is restored, battery-backup up RTC 308 can again use 32768__A as a time base. When on/off switch 38 detects VAUX 10 above a threshhold voltage, circuit 750 again determines that 32768__A may be used. Circuit 750 synchronously switches multiplexer 30 by monitoring synchronization signal 54 output by comparator 44. When synchronization signal 54 is determined to be low, circuit 750 starts the beginning of a 32768__A cycle with signal 32768__A low, and switches multiplexer 30 to select signal 32768__A.

Figure 2:
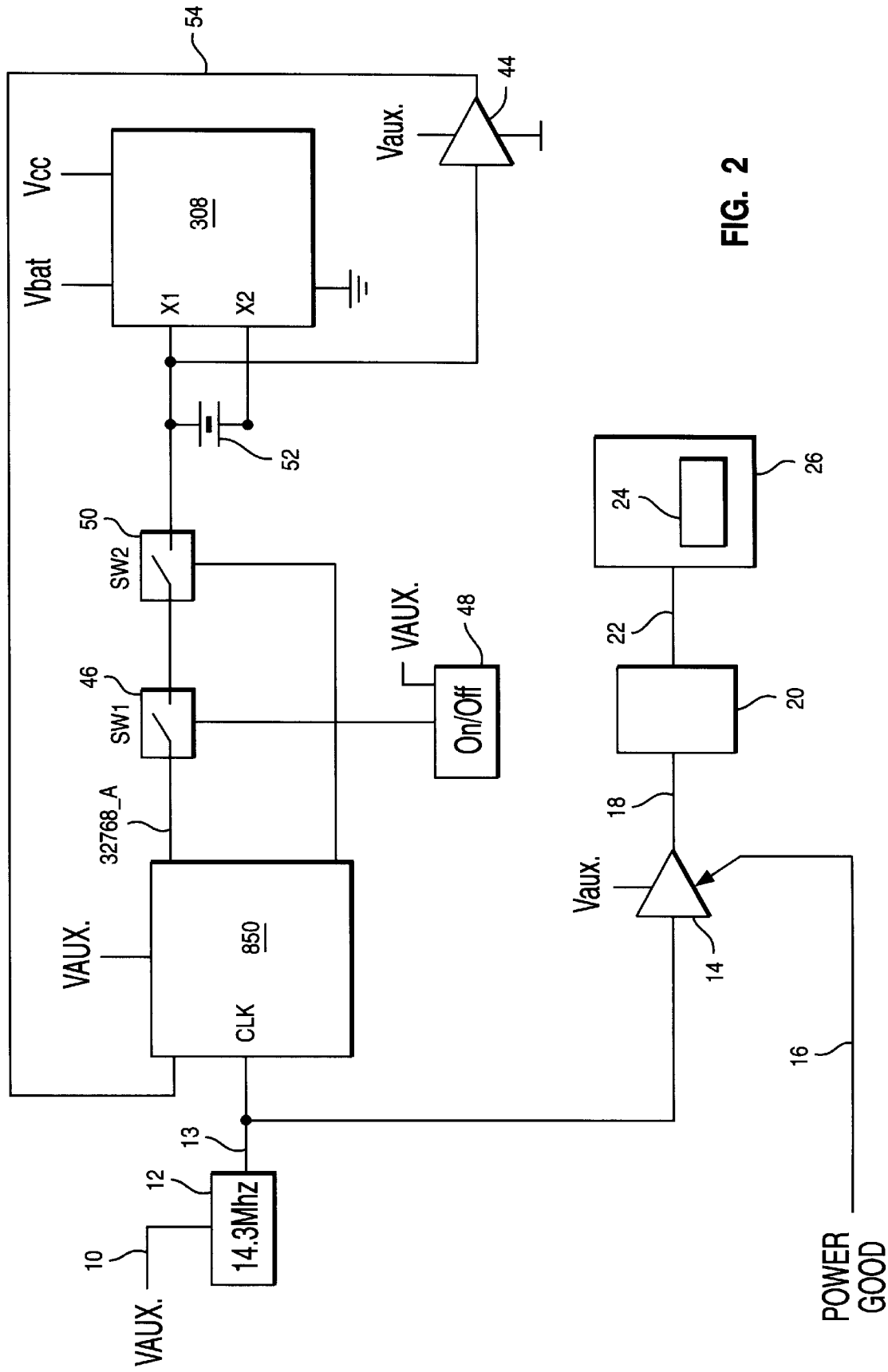
FIG. 2 is a circuit diagram of an alternate embodiment of a master/slave time base circuit.

Referring now to FIG. 2, an alternate embodiment of the present invention will now be described. As shown in FIG. 2, VAUX 10 powers 14.3 MHZ oscillator 12, which drives a microprocessor clock generator, as described above with reference to FIG. 1. Signal 13 from oscillator 12 is also input to PAL (programmable array logic) 850. PAL 850 is programmed to convert the 14.3, MHZ input frequency to a 32 KHz output frequency, 32768__A. Switch 46 is controlled by on/off circuit 48, and is used to isolate the 32768__A signal during transitions of VAUX. Switch 50 is used to couple the 32768__A signal to the battery-backed up clock, circuit 308, once VAUX 10 has stabilized.

If the system becomes unplugged, or main power fails, on/off circuit 48 detects VAUX 10 falling below a threshold voltage, and opens switch 46. This allows crystal 52 to control the frequency of operation. Note that in the described embodiment, crystal 52 is a 32 KHz crystal. An oscillator (not shown) is integrated within circuit 308, and is driven by crystal 52. Because the frequencies of the oscillator driven by crystal 52 and 32768__A are close, but not exactly the same, the oscillator makes a small adjustment until its frequency becomes the resonant frequency. In other words, when switch 46 and switch 50 are both closed, signal 32768__A drives the X1 input of circuit 308. When either switch 46 or switch 50 (or both) are open, the oscillator in circuit 308 adjusts to the crystal frequency of crystal 52.

When the system is plugged in again, or main power is restored, battery-backup up RTC 308 can again use 32768__A as a time base. PAL 850 contains logic which monitors output signal 54 from comparator 44. As VAUX 10 becomes available, a synchronous connection is made to crystal 52. Comparator 44 allows PAL 850 to monitor synchronization signal 54. When synchronization signal 54 is determined to be low, PAL 850 starts the beginning of a 32768__A cycle with 32768__A low, and closes switch 50. Once the 32768__A signal is connected to input X1 of RTC circuit 308, it again begins to operate using the 32768__A signal as a time base.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A method for calculating elapsed time in a computer system, comprising the steps of:

providing a processor clock with a first signal, having a first frequency, generated by a first oscillator, wherein the first oscillator receives power from a power source which remains operative when the computer system is powered down;

converting the first signal to a second signal, wherein the second signal has a second frequency;

providing the second signal to a backup clock; and upon detecting that the power source is unavailable, transitioning from the second signal to a third signal, wherein the third signal is provided to the backup clock, and wherein the third signal is generated by a second oscillator having a third frequency substantially equivalent to the second frequency, and wherein the second oscillator is powered by a battery.

2. A method according to claim 1, further comprising the step of transitioning from the third signal to the second signal when it is detected that the power source is available.

3. A method for calculating elapsed time in a computer system, comprising the steps of:

supplying a processor, a first oscillator, and a frequency converter by a primary power supply;

generating a first signal, having a first frequency, by the first oscillator;

generating a date and time of day by the processor, while the processor is powered up;

generating a second signal, having a second frequency, by the frequency converter in response to the first signal;

supplying a second oscillator and a backup clock by a backup power supply;

generating a third signal, having a third frequency substantially equivalent to the second frequency, by the second oscillator;

generating the date and time of day by the backup clock in response to the second signal, when the computer system is powered down and the primary power supply is available; and generating the date and time of day by the backup clock in response to the third signal, when the computer system is powered down and the primary power supply is not available.

4. A circuit for calculating elapsed time in a computer system, comprising:

a power source which remains operative when the computer system is powered down;

a first oscillator, powered by the power source, and operating at a first frequency;

a first clock, driven by a first signal from the first oscillator;

means for converting the first signal to a second signal, having a second frequency;

a backup clock, driven by the second signal;

a second oscillator, powered by a battery, and operating at a third frequency, wherein the third frequency is substantially equivalent to the second frequency;

means for determining that the power source is unavailable; and means for driving the backup clock by transitioning from the second signal to a third signal, wherein the third signal is generated by the second oscillator.

5. A circuit according to claim 4, further comprising:

means for determining that the power source is available; and means for transitioning from the third signal to the second signal to drive the backup clock.

6. A circuit according to claim 4, wherein said means for converting the first signal to the second signal comprises a microcontroller.

7. A circuit according to claim 4, wherein said means for converting the first signal to the second signal comprises a programmable array logic circuit.

8. A circuit for calculating elapsed time in a computer system, the computer system including a processor, a first oscillator, and a frequency converter powered by a primary power supply, the circuit comprising:

means for generating a first signal, having a first frequency, by the first oscillator;

means for generating a date and time of day by the processor, while the processor is powered up;

means for generating a second signal, having a second frequency, by the frequency converter in response to the first signal;

means for supplying a second oscillator and a backup clock by a backup power supply;

means for generating a third signal, having a third frequency substantially equivalent to the second frequency, by the second oscillator;

means for generating the date and time of day by the backup clock in response to the second signal, when the computer system is powered down and the primary power supply is available; and means for generating the date and time of day by the backup clock in response to the third signal, when the computer system is powered down and the primary power supply is not available.

* * * * *